June 29, 1937.  L. M. FRANCIS  2,085,214
VEHICLE CONSTRUCTION
Filed Dec. 29, 1933  2 Sheets-Sheet 1
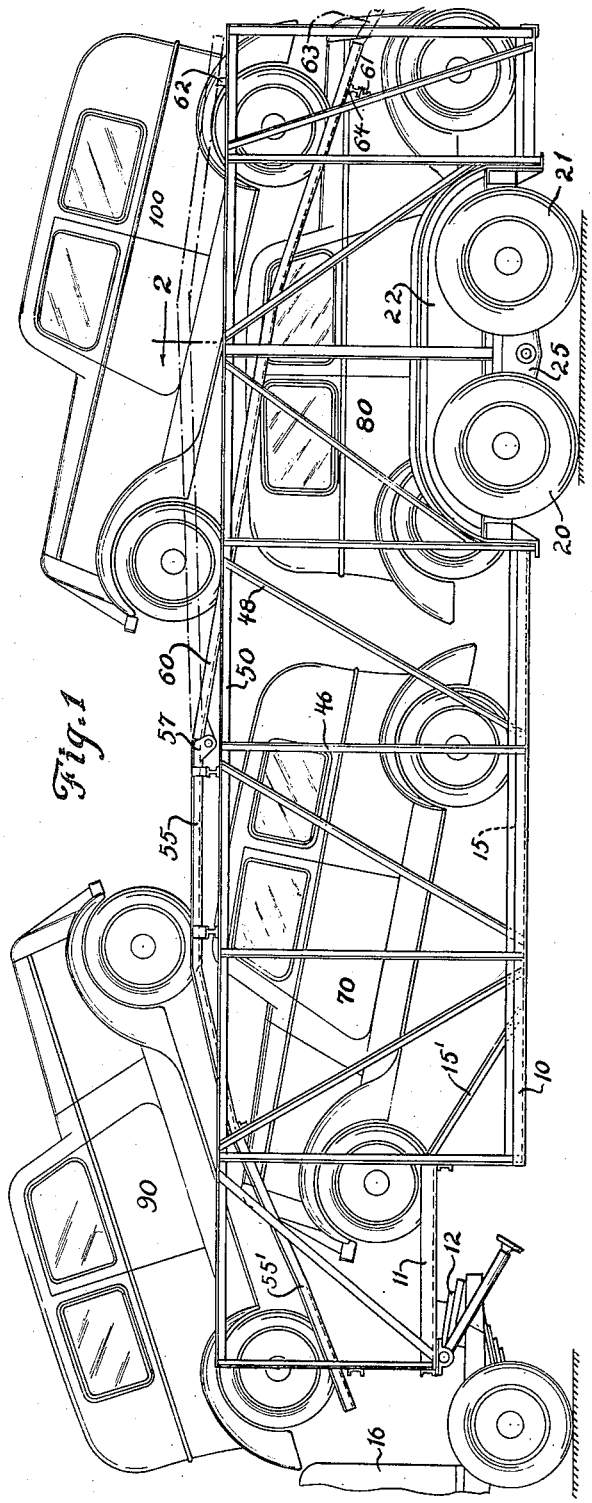
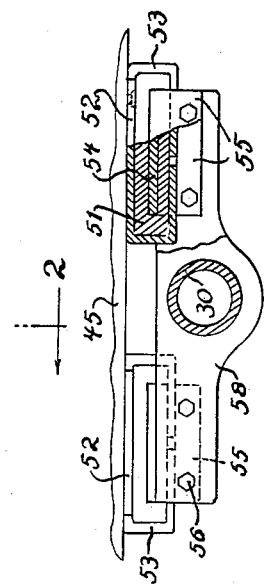
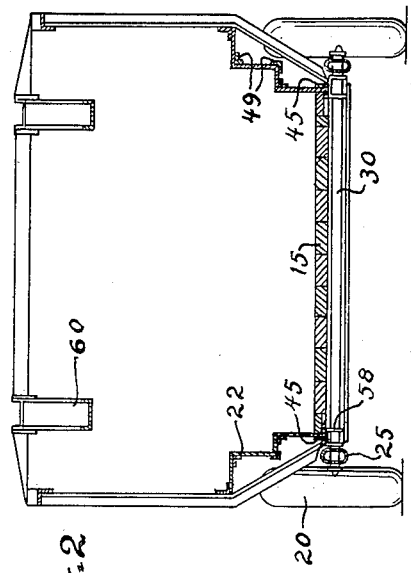
INVENTOR.
Lynn M. Francis
BY
ATTORNEYS.

June 29, 1937.   L. M. FRANCIS   2,085,214
VEHICLE CONSTRUCTION
Filed Dec. 29, 1933   2 Sheets-Sheet 2

INVENTOR.
Lynn M. Francis
BY
Swan, Frye & Hardesty
ATTORNEYS.

Patented June 29, 1937

2,085,214

UNITED STATES PATENT OFFICE 2,085,214

VEHICLE CONSTRUCTION

Lynn M. Francis, Birmingham, Mich., assignor to Mechanical Handling Systems, Inc., Detroit, Mich., a corporation of Michigan Application December 29, 1933, Serial No. 704,500

22 Claims. (Cl. 280—124)

This invention relates to conveying equipment for motorcars and the like, and more particularly aims to provide novel and compact apparatus especially adapted for transporting completed automobiles over roads, and possessing advantages not heretofore available in such conveyances. An important object of the invention is also the provision of an extremely compact conveyance, the dimensions of which are smaller in proportion to the transportable load than are those of any analogous equipment heretofore developed, as a result of which, despite statutory and other regulations limiting the permissible sizes of road vehicles, as many as four full-sized motorcars may be carried by means of hauling equipment but forty feet or less in length, twelve feet high and eight feet wide.

Another object is the provision of such conveying equipment adapted to support conveyed automobiles in a novel grouping arrangement making possible the aforementioned extreme compactness.

A still further object is the provision of novel and improved running gear for such transporting conveyances, adapted to increase both the usable width and height of the vehicle, and which prevents the transmission of the full force of road shocks to the body of the vehicle without the use of interposed springs, thus reducing the height of the vehicle and enabling the disposition of conveyed automobiles in superposed or double-decked arrangement while the height of the loaded equipment is nevertheless kept unusually low.

A further object is the provision of running gear possessing in addition to the aforementioned advantages the virtue of greatly steadying the vehicle against sidesway.

A further object is the incorporation in such a conveyance of a novel tandem wheel running gear construction incorporating wheels in pairs independently mounted on separate stub axles connected and carried by rocker arms which are supported from a common main shaft, and so designed that the main shaft is disposed lower than the axes of the wheels and formed without a dropped center, whereby the usable space between the wheels is greatly increased.

Still another object is the provision of improved movable supporting means for upper ones of superposed conveyed automobiles, portions of which supporting means are arranged lower than parts of lower conveyed automobiles but shiftable to and from such low position to facilitate loading and unloading.

Other objects and advantages will be apparent from the following description, wherein reference is made to the accompanying drawings illustrating preferred embodiments of my invention, and wherein similar reference numerals designate similar parts throughout the several views.

In the drawings:—

Figure 1 is a side elevational view of a conveyance in the form of a trailer incorporating the principles of this invention and loaded with automobiles to be conveyed, fragmentarily showing a tractor for hauling the same;

Figure 2 is a vertical section substantially on line 2—2 of Figure 1 and looking in the direction of the arrows;

Figure 7 is a fragmentary detail section taken substantially on line 7—7 of Figure 4 and looking in the direction of the arrows.

Figure 3:
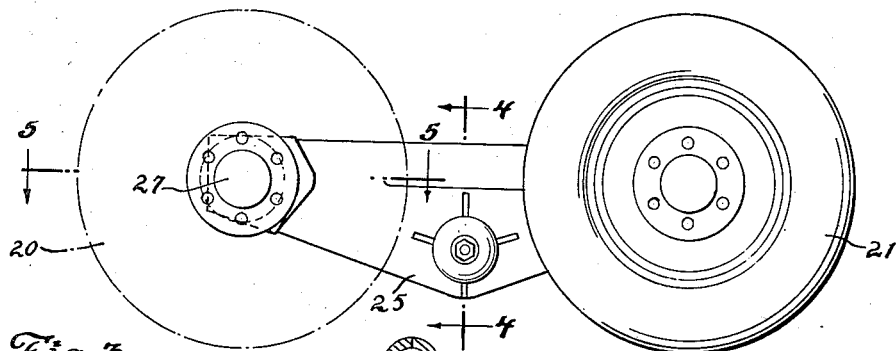
Figure 3 is an enlarged detail side elevation of the running gear.

Referring now to the drawings, reference character 10 designates the longitudinally extending lower frame members of my improved trailer. The trailer may either be provided with unbroken flooring as 15 or may carry spaced tracks adapted to support the wheels of automobiles, or other load. As shown in Figure 1 the floor or supporting section 11 near the front of the trailer is elevated, and an inclined runway portion 15' connects the elevated section 11 with the main floor 15. Coupling means for the trailer may be arranged beneath such elevated section, as at 12, providing for coupling the trailer to a hauling device, such as the tractor fragmentarily shown and denominated 16.

Near the rear extremity of the trailer its framework is provided with recessed wheel-housing portions as 22. The wheels will be seen to be arranged in tandem pairs in such wheel housings, and each wheel (20—21) of each pair is carried by and at the opposite end of a rocking or walking beam 25, in the manner best shown in Figures 3 to 6 inclusive. The wheels are mounted on stub axle shaft 27, one carried by and projecting outwardly from each end of each beam. The beams, there being of course one on each side of the vehicle, are centrally pivoted on an axis lower than the stub shafts, such support being furnished by the main axle 30, which extends across and beneath the vehicle in more or less conventional position tho secured thereto in a novel manner presently to be described.

The shape and construction of the like but oppositely disposed rocking beams will be apparent from the drawings. A bearing bushing, as 29, extends through the wide central portion of each, being welded or otherwise suitably secured in walls defining the hollow beam, as at 31, and projecting inwardly therefrom to support suitable bearings, as 33, the bushing and beam being additionally braced by stiffening ribs, as 35. A cap, as 37, closes the end of the hub formed by the bushing 29, being secured in place by nut and bolt means 38—39, the stem portion of the bolt projecting axially from a supporting plug 41 inserted and secured in the axle 30.

Figure 4:
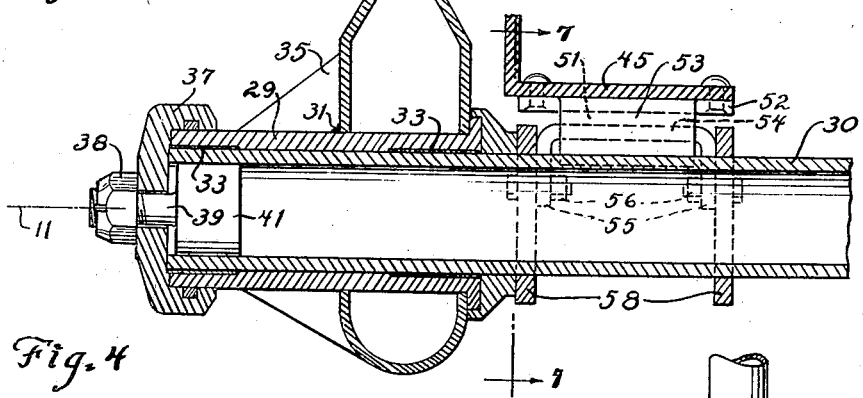
Figure 4 is a vertical section taken substantially on the line 4—4 of Figure 3 and looking in the direction of the arrows.
Figure 5:
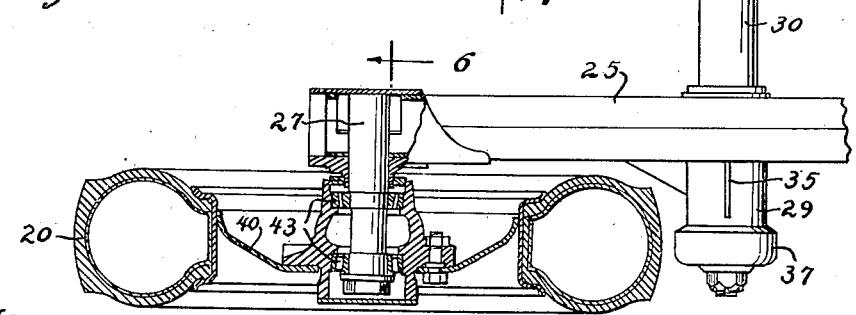
Figure 5 is a horizontal section taken substantially on the line 5—5 of Figure 4 and looking in the direction of the arrows.
Figure 6:
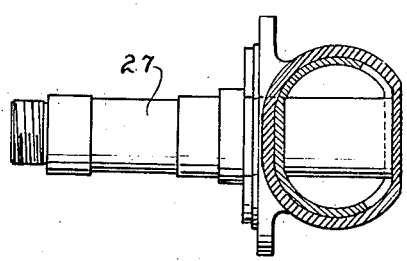
Figure 6 is a detail section taken substantially on the line 6—6 of Figure 5 and looking in the direction of the arrows.

In mounting the wheels 20—21 upon stub shafts 27, anti-friction bearings, as 43, are preferably interposed. My preferred method of securing the axle 30 to the framework of the trailer is best illustrated in Figures 4 and 7. Since no springs of the conventional variety are used, and the maximum possible movement of the main axle 30 relatively to the frame is quite restricted, the axle may be arranged very close to the frame, as shown. Appropriately positioned and depending from the longitudinal frame members, or the elevated section as 45 thereof, are brackets whose construction requires separate description.

Each bracket is formed of heavy sheet metal having a flat upper portion as 52 secured to a frame member and carrying a lower portion 53 looped to form a transversely extending tubular support for a quantity of resilient rubber 51, which is preferably bonded thereto. Centrally thru the rubber mass 51 and also preferably bonded thereto is a carried U-bracket 54 having downturned leg plates 55.

As shown in Figures 1 and 2 the side frame members 10 may be interrupted appurtenant the wheels by a section as 45, forming a continuation thereof, which is slightly elevated, to an extent dictated by the desired road clearance and the vertical dimensions of the main axle 30 and its securing means, but the floor 15, or other supporting means may continue substantially flat and uninterrupted over the axle, which is arranged below them, as very little elevation is needed and reinforcement of this portion of the vehicle is provided by the inward angling of vertical bracing member 46' and its securance at the bottom to the longitudinal frame members, as well as by the reenforcing members as 49 of the wheel housing.

The bracing and supporting structure comprising vertical and inclined girders designated 46—48, supports longitudinal top side rails 50 and upper track sections 55—60 adapted to support additional automobiles above those carried by the floor portions. The forward part 55' of the upper track section inclines downwardly toward the front of the trailer, while its higher rear portion is horizontal and slightly elevated above the top rails 50. The rear extremity of each track 55 also carries a hinge portion 57 by which the rear track section 60 is pivotally connected thereto for vertical swinging movement from the lowered position in which it is shown in full lines in Figure 1 to the elevated position shown in dot-dash lines in that view. The swingable track section 60 is adapted to be supported in either position by brackets 61—62 and a movable cross rail as 64 which may extend between either the upper brackets 62 or the lower 61, as the case may be. When the crossbar 64 is so supported by either pair of brackets, the swingable tracks may rest at their ends directly upon the cross bar 64.

It will be seen that when the rear track sections are raised to the position shown in dot-dash lines, automobiles to be conveyed may be run directly onto the lower floor 15, the front car as 70 being driven or rolled in head first, and its front wheels run upon the elevated front section 11 as shown in Figure 1, so that its hood lies immediately beneath or partially between the inclined front sections 55' of the upper rails. These rail sections may be positioned as low as the height of the hoods of cars to be carried will permit. A second car (80) to be carried by the lower tracks or supporting means is preferably arranged in the opposite position, being backed upon the trailer with its hood portion so positioned as to be directly beneath or partially projecting between the lower rear portions of the swingable upper-track sections 60 when the latter are lowered into place.

After both lower cars, designated 70—80 respectively, have been so positioned, and the rear track section lowered and secured in the full line position, additional cars as 90—100 may be run upon the upper track sections, preferably with their hoods toward the center of the trailer, so that their higher body portions may be carried by the lower front and rear portions of the inclined track sections 55—60 respectively, and the overall height of the trailer and load thereby kept at a minimum.

In order to facilitate loading the cars upon both the upper and lower tracks, temporary runways, as indicated in dot-dash lines and designated 63, may be connected to the extremities of the tracks 15—55—60. The front upper car, as 90, may of course be run upon the forward track sections 55—55' from the front end of the trailer, without uncoupling the same from the tractor, by merely turning the tractor with relation to the trailer sufficiently to permit it.

Four automobiles may by virtue of this construction be conveyed in a most compact and safe manner. The arrangement of the novel running gear in cooperation with the disposition of the superposed supports in such manner that the cars conveyed actually interfit in a way most efficiently conservative of space makes possible the reduction of overall dimensions to an extent heretofore unattained, while the low arrangement made possible and steadiness provided by the running gear construction greatly enhance the safety of the device, by largely eliminating the previous danger of tipping in emergencies such as sometimes arise on high crowned roads, when tires fail, or when the driver must for one reason or another leave the road or swerve at high speed.

The saving of material effected and the general inexpensiveness and simplicity of the construction will further be appreciated, and while it will be apparent that the illustrated embodiments of my invention herein disclosed are well calculated to adequately fulfill the objects and advantages primarily stated, it is to be understood that the invention is susceptible to variation, modification and change within the spirit and scope of the subjoined claims.

What I claim is:—

1. In a vehicle incorporating a frame and wheels, suspending means connecting the wheels comprising a transverse shaft, longitudinally extending rocking beams fulcrumed on the shaft on opposite sides of the vehicle, a pair of wheels rotatably carried by each rocking beam and journaled on axes higher than the fulcra of the rocking beams, and means for securing the transverse shaft to and in close proximity to the frame, including brackets having carrying and carried portions and an interposed cushion of resilient rubber.

2. In a vehicle incorporating a frame and wheels, suspending means connecting the wheels and frame comprising a transverse shaft, longitudinally extending rocking beams fulcrumed on the shaft on opposite sides of the vehicle, a pair of wheels rotatably carried by each rocking beam one wheel being arranged near each end of the beam, and means securing the transverse shaft to and in close proximity to the frame, including brackets having carrying and carried portions and interposed cushioning means partially housed by such portions.

3. A vehicle chassis including an axle, a pair of walking beams on the axle at opposite ends thereof, a pair of longitudinally extending beams between said walking beams, cross bars extending between said longitudinally extending beams, and brackets secured to one of said cross bars and having aligned openings receiving said axle.

4. In a vehicle, a dual walking beam axle assembly including an axle, a pair of supporting brackets for the axle, headed elements secured in and projecting from opposite ends of the axle, walking beams having tubular portions sleeved on the axle upon the outer sides of the brackets, and means carried by the headed elements and cooperating with the brackets for maintaining the beams in proper position longitudinally of the axle.

5. In a vehicle chassis structure, a frame, a bracket rigid with the frame at one side thereof, a walking beam beside and substantially parallel to said frame, an axle extending through the bracket and walking beam, and means carried by the axle and cooperating with the bracket for holding the walking beam in proper position relative to said frame.

6. A vehicle chassis having a frame, brackets rigid with the frame at opposite sides thereof, walking beams beside said brackets, an axle extending through the brackets and walking beams, and means carried by the axle and cooperating with the brackets for holding the walking beams in proper position relative to said frame.

7. In a vehicle chassis structure, a frame, an axle beneath and projecting beyond one side of said frame, a bracket secured to the frame at one side thereof and having an opening receiving the axle, a walking beam sleeved on the axle beside the frame, a member secured to and projecting endwise from the axle, and means carried by said member and cooperating with the bracket for holding the walking beam in proper position relative to said frame.

8. In a vehicle chassis structure, a frame, a bracket secured to one side of said frame at one edge thereof, an axle extending through the bracket and having a tubular end portion, a walking beam sleeved on the axle beside the edge aforesaid of the frame, a headed element secured in and projecting endwise from the tubular end portion of the axle, and means for holding the walking beam on the axle in proper position relative to the bracket including a member sleeved on the headed element and closing the tubular end portion of said axle.

9. In a vehicle chassis structure, a frame, a bracket secured to the under-side of said frame at one side edge thereof, an axle beneath the frame extending through said bracket, a walking beam having a transversely extending tubular portion sleeved freely on the axle beside the bracket, and means cooperating with the bracket for holding the walking beam in proper position relative to the frame, including an abutment member carried by the axle in spaced relation to the bracket.

10. A semi-trailer having walking beams upon opposite sides thereof, an axle extending transversely of said trailer and terminally connected to said walking beams, ground engaging wheels arranged in tandem upon opposite ends of and connected to said beams, and means for carrying automobiles extending longitudinally of said trailer throughout substantially its entire length in a substantially horizontal plane beneath the axis of rotation of said wheels and above said axle.

11. A semi-trailer having side frame members spaced to provide clearance therebetween for vehicles to be transported, means between said side frame members for carrying automobiles, an axle extending transversely of the trailer beneath said means, walking beams rockably engaging said axle upon opposite sides of the trailer, spindles projecting outwardly from said walking beams at opposite ends thereof above the means aforesaid, and ground engaging wheels mounted on said spindles.

12. A semi-trailer having side frame members spaced for receiving automobiles therebetween, means between said side frame members for carrying automobiles, an axle extending transversely of the trailer beneath said means, walking beams rockably engaging said axle upon the opposite sides of said trailer having the ends thereof extending upwardly above the level of said means, spindles projecting outwardly from the walking beams at opposite ends thereof, tandem wheels engaging said spindles, and means intermediate the ends of the walking beams for bracing said beams upon said axle.

13. A semi-trailer having an axle extending transversely thereof, walking beams pivoted intermediate their ends upon said axle, one upon each side of said trailer, spindles rigid with and projecting laterally from said walking beams at opposite ends thereof, said spindles being in a common horizontal plane above said axle, ground engaging wheels carried by said spindles, and a deck extending longitudinally of the trailer above the axle but underneath the horizontal plane aforesaid of said spindles.

14. A semi-trailer having a non-rotating axle extending transversely thereof, walking beams upon opposite sides of said trailer fulcrumed intermediate their ends on said axle, means at opposite ends of said axle for holding said walking beams against displacement relative to said trailer, spindles rigid with and projecting laterally from said beams at opposite ends thereof and having their outer ends free, ground engaging wheels on said spindles, and automobile carrying means extending longitudinally of the trailer above the axle but beneath the spindles.

15. A semi-trailer of the class described, having a non-rotating axle extending transversely across the same, ground engaging wheels supported from said axle upon opposite sides of said trailer with their axis of rotation above the horizontal plane of the axle, and a platform extending longitudinally of the trailer between said wheels beneath the axis of rotation thereof but above the plane aforesaid of said axle.

16. In a semi-trailer equipped with tandem wheels having spindles, the combination of a chassis frame between said tandem wheels, upright side frames carried by the chassis frame at opposite sides thereof, a pivoted deck for supporting automobiles carried by said upright frames, and means for supporting automobiles beneath said pivoted deck including a lower deck carried by and rigid with the chassis frame between the upright frames and beneath the tandem wheel spindles.

17. In a semi-trailer equipped with tandem wheels having spindles, the combination of a chassis frame between said tandem wheels, upright side frames upon said chassis frame, an upper deck for carrying automobiles carried by said side frames and provided at its rear end with a pivoted section, and a lower deck carried by and rigid with the chassis frame between the upright frames, said lower deck being provided beneath the pivoted section of the upper deck with a substantially straight portion that extends throughout substantially the entire length of the chassis frame in a substantially horizontal plane and beneath the tandem wheel spindles.

18. In a semi-trailer equipped with a transversely extending axle, walking beams on the axle at opposite ends thereof, and tandem wheel spindles projecting outwardly from said beams, the combination of a chassis frame between said walking beams, upright side frames carried by the chassis frame, an upper deck for carrying automobiles carried by said upright side frames, and means for carrying automobiles located beneath the upper deck between the walking beams, said means being above the axle but beneath the tandem wheel spindles and rigid throughout its length with the chassis frame, whereby automobiles may be loaded upon and unloaded from said means beneath the upper deck without movement of said means.

19. In a semi-trailer equipped with a transversely extending axle, walking beams on the axle at opposite ends thereof, and tandem wheel spindles projecting outwardly from said beams, the combination of a chassis frame between said walkframe, an upper deck for carrying automobiles carried by said side frames, and a lower deck carried by the chassis frame beneath the upper deck, said lower deck being between the walking beams above the axle but beneath the tandem wheel spindles.

20. In a semi-trailer equipped with a transversely extending axle, walking beams mounted upon said axle at opposite ends thereof, and tandem wheel spindles projecting outwardly from said walking beams, the combination of a chassis frame between the walking beams, uprights at opposite sides of said chassis frame, an upper automobile supporting deck carried by said uprights and provided at its rear end with a pivoted portion that is movable above said axle, and a lower deck carried by the chassis frame between said uprights, the major portion of said lower deck being in a substantially horizontal plane between the walking beams above the axle and beneath the tandem wheel spindles and being rigid relative to the chassis frame and uprights whereby automobiles may be loaded upon and unloaded from said lower deck without movement of any portion of said lower deck when the pivoted portion aforesaid of the upper deck is elevated.

21. In a semi-trailer equipped with a transversely extending axle, walking beams mounted upon said axle at opposite ends thereof, and tandem wheel spindles projecting outwardly from said walking beams, the combination of a chassis frame between the walking beams, uprights at opposite sides of said chassis frame, an upper automobile supporting deck carried by said uprights and provided at its rear end with a pivoted portion that is movable above said axle, and a lower automobile supporting deck carried by the chassis frame between the uprights, a portion of the lower deck from the rear end thereof to a point in advance of the pivoted portion of the upper deck being straight and disposed between the walking beams above the axle and beneath the wheel spindles.

22. In a semi-trailer equipped with a transversely extending axle, walking beams mounted upon said axle at opposite ends thereof, and tandem wheel spindles projecting outwardly from said walking beams, the combination of a chassis frame between said walking beams, a lower automobile supporting deck extending longitudinally of the chassis frame between said walking beams, a portion of said lower deck being above the axle but below the wheel spindles, said portion being substantially straight throughout its length whereby the forward and rear wheels of an automobile may be carried in substantially a common horizontal plane fore and aft of the axle, uprights at opposite sides of the chassis frame, and an upper automobile supporting deck carried by said uprights in such spaced relation to the lower deck that at least two automobiles may be loaded onto and unloaded from the lower deck beneath the upper deck without movement of any portion of said lower deck.

LYNN M. FRANCIS.